INVENTORS.
James A. Anderson.
Jacob A. Ash.
BY Wood, Herron & Evans.
ATTORNEYS.

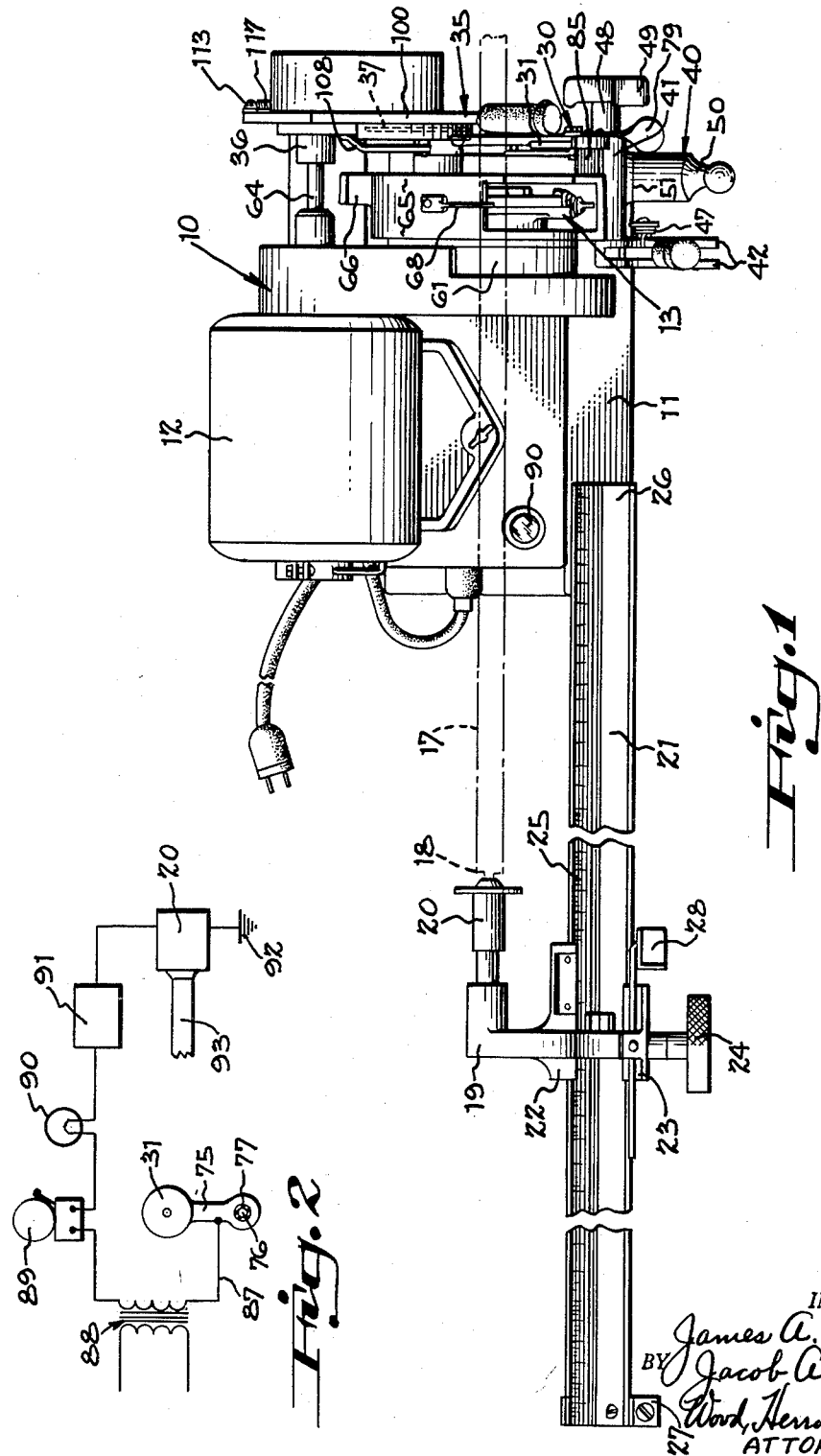
Feb. 18, 1964   J. A. ANDERSON ETAL   3,121,359
APPARATUS FOR CUTTING ROLLER SHADES
Filed Oct. 31, 1960   3 Sheets-Sheet 1
INVENTORS.
James A. Anderson.
Jacob A. Gsh.
BY Wood, Herron & Evans.
ATTORNEYS.

Feb. 18, 1964 — J. A. ANDERSON ETAL — 3,121,359
APPARATUS FOR CUTTING ROLLER SHADES
Filed Oct. 31, 1960 — 3 Sheets-Sheet 3

INVENTORS.
James A. Anderson.
Jacob A. Ash.
BY Wood, Herron & Evans.
ATTORNEYS.

United States Patent Office 3,121,359
Patented Feb. 18, 1964

3,121,359
APPARATUS FOR CUTTING ROLLER SHADES
James A. Anderson and Jacob A. Ash, Muskegon, Mich., assignors to Breneman-Hartshorn, Inc., Cincinnati, Ohio, a corporation of Ohio
Filed Oct. 31, 1960, Ser. No. 66,187
2 Claims. (Cl. 82—83)

This invention relates to apparatus for cutting a roller shade and more particularly the invention is directed to improvements in shade cutters to adapt such shade cutters for cutting metal rollers.

The present invention is an improvement in the shade cutter of the type disclosed in Patent No. 2,888,048. That patent discloses a shade cutter having a base, a chuck and bracket combination for rotatably supporting a window shade, an electric motor for driving the chuck and two pivotally mounted cutting tools. The first of the cutting tools comprises a stationary blade mounted at the end of an arm, the blade being movable into engagement with the window shade for cutting the fabric. The second cutting tool is pivotally mounted on an arm and is movable into engagement with the roller to cut through the roller.

The machine thus described and as more fully disclosed in the patent referred to above is well-suited for rapidly and accurately cutting both the fabric and roller of a window shade having a wooden roller.

An objective of the present invention is to provide improvements in the known shade cutting machine which better adapt the machine for cutting window shades having metal rollers, the invention being specifically directed to improvements which will increase the life of the cutting tools.

In the normal operation of the patented machine, the window shade is rotated by the chuck and the fabric cutting tool moved into engagement with the rotating window shade. The knife edge of the fabric cutting tool slices through the fabric due to the rotation of the window shade with respect to the cutting tool. After the cutting tool has passed through the fabric, the pressure on the tool is removed and the cut segment of the fabric stripped from the roller. Thereafter, the roller cutting tool is brought into engagement with the rotating roller at a position spaced slightly from the cut edge of the fabric. The relative rotation of the roller with respect to its cutting tool will sever the roller.

Applying these operations to a window shade having a metal roller, as the fabric cutting tool strikes the metal roller, the rotation of the metal roller quickly dulls the knife edge of the cutting tool. The improvement provided by the present invention substantially eliminates the dulling effect of engagement of the fabric cutting tool with the metal roller. To this end the invention contemplates the employment of the cutting tool and the metal roller as two contacts in an electrical control circuit, the tool and roller being connected in series with a source of electrical power and a control device such as a signal light, audible signal, or circuit interrupting relay which would de-energize the chuck driving motor.

The electrical control device eliminates the requirement of the operator's having to detect the fact that the fabric has been completely severed by means of increased pressure on the cutting tool from its engagement with the metal roller. By eliminating the requirement of sensing increased pressure, the increased pressure which dulls the cutting tool does not have to be applied.

In the cutting of the metal roller after the fabric has been severed and removed somewhat different considerations obtain. The machine described in the patent, which is directed to cutting of wood shade poles, employs a four segment cutting tool which is fixed to the end of the arm upon which it is mounted. The tool mounting means is designed to permit the making of an angular adjustment in the position of the tool to bring a new cutting segment into position for cutting engagement with the roller. Thus, as a segment of the tool becomes dulled from use, the tool can be adjusted to bring a new segment into operational position.

We have found that in cutting metal rollers it is necessary to use a rotating circular saw. We prefer a jeweler's slotting saw the life of which can be very greatly increased if the tool is rotated at a high rate of speed, as for example, 2,000 r.p.m. It has therefore been an objective of the invention to provide a circular or disc saw in combination with window shade cutting apparatus and to provide driving connection to the saw by which it can be driven at a high rate of speed relative to the metal roller.

In furtherance of this objective of the invention, we provide a combination in which the arm to which the cutting disc is fixed is mounted to pivot about the rotary axis of the chuck driving motor and we provide a direct chain or belt drive between the motor shaft and the cutting tool. Thus the arm to which the cutting tool is mounted can be pivoted to and from engagement with the shade roller without affecting the drive connection to the cutting tool.

The several features of the invention will become more readily apparent from the following detailed description taken in conjunction with the accompanying drawings in which:

FIG. 1 is a top plan view of a shade cutter of my invention.

FIG. 2 is a circuit diagram embodying features of my invention.

*The General Combination*

Figure 3:
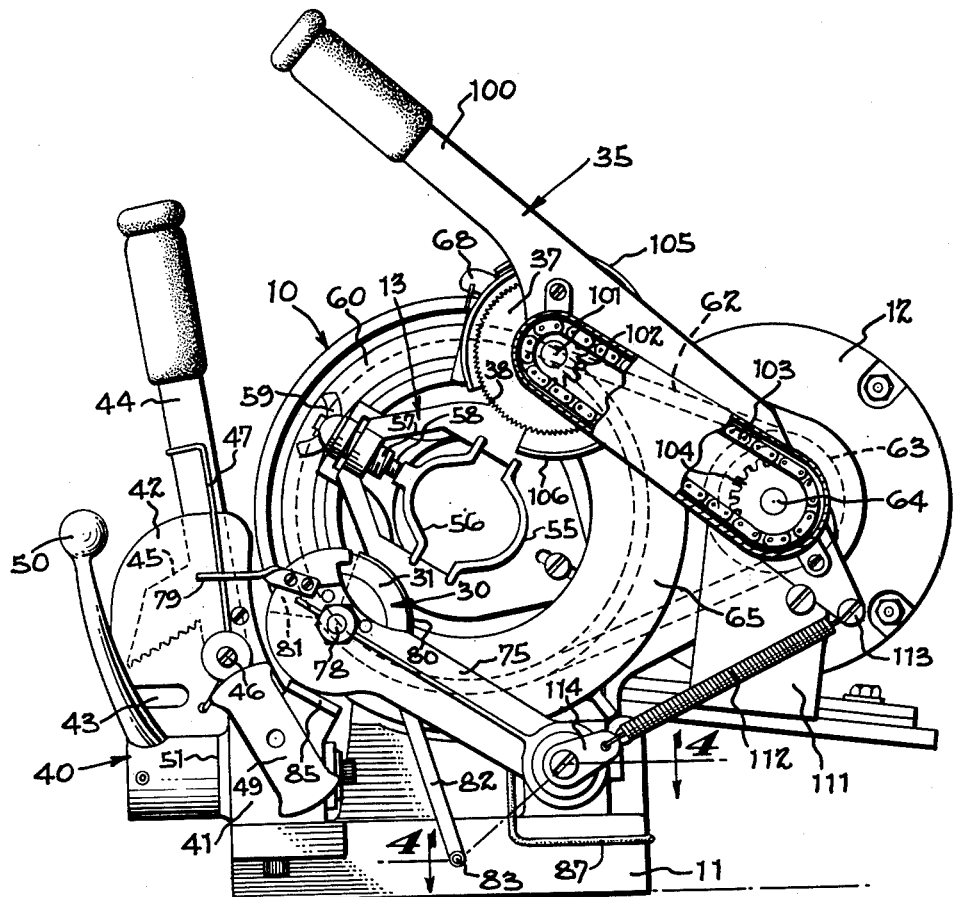
FIG. 3 is an end elevational view of my invention.

A shade cutter 10 has a base 11 to which a drive motor 12 is mounted. The motor 12 is connected to drive a chuck 13 which receives a window shade shown in broken lines at 17. The shade is secured in the chuck 13 and is rotated by the chuck 13 through its connection to the motor 12 all in the manner to be described below. One end 18 of the shade 17 is supported by a bracket 19 having a rotatable bearing member 20 standing outwardly from the bracket 19. The bracket 19 is mounted upon a V-shaped slide support 21 by means of jaws 22 and 23 which are controlled by a threaded clamping bolt 24.

The V-shaped slide support 21 is calibrated as shown at 25 so as to permit the measurement of the proper length of shade to remain after cutting. As determined by the desired measurements, the bracket 19 is slid along the support 21 and clamped in position by the threaded clamping bolt 24. The support 21 is fixed at one end 26 to the base 11 and at the other end it is supported by a foot 27.

A fabric cutter 30 is pivotally mounted on the base 11 in the manner to be described below. The fabric cutter has a disc shaped cutting element 31 which is spaced slightly from the chuck 13 and which is movable into engagement with the window shade to cut the fabric.

The window shade will be described as having a roller about which a fabric is wrapped. It is to be understood that the term fabric is employed in its generic sense to refer to any suitable flexible window shade material such as plastic or woven cloth.

Roller cutter 35 is pivoted at 36 to the base 11. The cutting element for the roller cutter is shown in FIG. 1 in broken lines as indicated at 37. As viewed in FIG. 1, the roller cutting element is positioned slightly to the right of the fabric cutting element 31 so that in the cutting operation, approximately ⅜ of an inch of roller will project beyond the cut edge of the shade fabric.

The manner in which the roller cutter is mounted and drivably connected to the motor 12 will be described in greater detail below.

A slat cutter and pin puller combination 40 is mounted at the edge of the base 11. The assembly includes a casting 41 having a pair of vertically extending plates 42 which are horizontally slotted at 43 (FIG. 3) to receive a slot not shown. An arm 44 has a saw tooth blade 45 (hidden lines) secured thereto and is pivoted about a pin 46. A downward pull on the arm 44 brings the saw tooth blade 45 into engagement with the slat to perform the cutting operation. A spring 47 urges the arm 44 into the upper position shown in FIG. 3.

The casting is bored to receive a collet 48 which has jaws, not shown, at the left end thereof as viewed in FIG. 1 the jaws being operated by a handle 49. The collet 48 is connected to a lever 50 which is pivotally mounted at 51 to the casting 41. Pivoting the lever 50 to the left or right positively drives the collet 48 to the left or right.

The pin may be pulled from a shade roller simply by clamping it in the collet 48 and pivoting the lever 50 to the right. Movement of the collet 48 to the right causes the pin to be pulled from the roller, the roller being blocked against movement with the pin by engagement of the end of the roller with the casting 41.

Chuck and Drive Means

As best shown in FIG. 3 the chuck 13 has a pair of jaws 55 and 56 which cooperate for movement toward and away from each other by means of a pair of telescoping threaded members 57 and 58 which are operated by a wing nut 59 fixed to the threaded member 57. Rotation of the wing nut 59 causes the jaw 55 to move in one direction with respect to the threaded member 57 and causes the jaw 56 to move in the opposite direction with respect to the threaded member 57 by means of the threaded member 58 which is fixed to the jaw 56. The jaw assembly just described is fixed to a sheave 60 which is rotatably mounted in a generally circular casting 61 (FIG. 1). A V-belt 62 passes around the sheave 60 and a smaller sheave 63 which is fixed to the shaft 64 of the motor 12. A shield 65 having a handle 66 projecting therefrom is pivotally mounted to the casting 61 and is pivotal about the axis of rotation of the chuck. A switch operating projection 68 is mounted on the shield 65 and is engageable with a switch not shown which is located in the base 11. The switch is in series with motor 12 and is spring biased to open position so that the motor can be energized only when the shield is pulled down over the chuck and held in that operating position.

Fabric Cutter

The fabric cutter comprises an arm 75 pivoted about a pin 76, the arm being spaced from the pin and the base 11 by an insulative bushing 77 which may be of nylon or the like. The free end of the arm 75 has the disc shaped cutting element 31 which is sharpened about the periphery thereof to a knife edge. The element 31 is secured to the arm by means of a nut and bolt 78 which may be loosened to permit the cutting element 31 to be angularly shifted. A handle 79 is fixed to the end of the arm 75 to swing the arm to and from operating engagement with the window shade fabric.

A mask 80 is pivotally mounted on the arm 75 immediately adjacent the cutting element 31. The mask 80 is of greater diameter than the cutting element 31 and when in its operation prevents accidental engagement with the knife edge of the cutting element. A sector of the mask 80 has been removed as at 81. A link 82 pivoted about a pin 83 on the base 11 is connected to the mask 80.

As the arm 75 is swung clockwise from the inoperative position of FIG. 3 into engagement with the fabric on the window shade, the link 82 pivots the mask 80 with respect to the disc shaped cutting element 31 so as to bring the removed sector 81 around to the operating edge of the cutting element whereby to expose the cutting element for operative engagement with the fabric.

Figure 4:
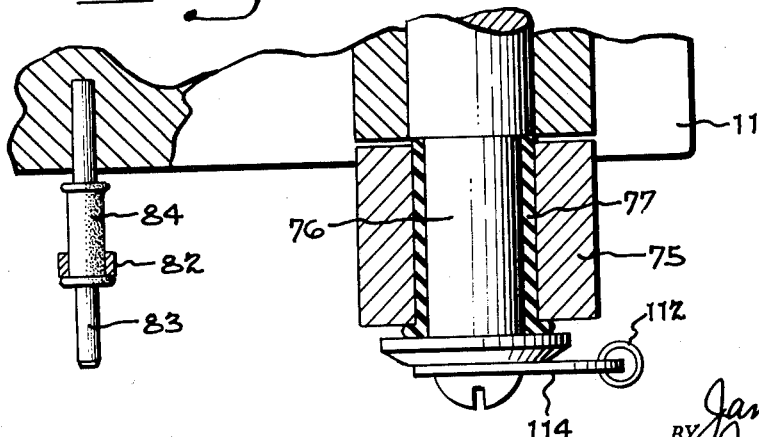
FIG. 4 is a cross sectional view taken along lines 4—4 of FIG. 3.

As shown in FIG. 4, the link 82 is electrically isolated from the pin 83 by an insulative bushing 84. It can be appreciated from the foregoing description that the fabric cutter is completely electrically isolated from all other elements of the apparatus except for the electrical circuit to be described below. To insure complete electrical isolation of the fabric cutter, insulative plate 85 is secured to the casting 41 so that counter-clockwise pivoting of the arm 75 will not bring the arm into engagement with metallic parts, the insulative plate 85 segregating the arm from the casting.

Electrical Control Circuit

As indicated above, it is an important feature of the invention to provide an electrically controlled circuit which will assure the immediate interruption of the fabric cutting operation as soon as it is completed in order to avoid unnecessary dulling of the fabric cutting element 31 through its engagement with a metal roller. A control circuit for that purpose is diagrammatically illustrated in FIG. 2. The circuit includes an electrical connector 87 which connects the metallic fabric cutter arm 75 to a power source 88. The power source may be the secondary of a transformer as shown in FIG. 2 or it may be a dry cell battery or any other suitable source of electric current. The power source 88 is connected in series with at least one control element. The control element may be an audible signal such as a bell indicated at 89; it may be an electric light bulb such as is indicated at 90 or it may be a control relay as indicated at 91 which would have its contacts connected to interrupt the main circuit to the drive motor. Normally only one such control element would be necessary, and preferably a warning light 90 is employed, such a light being shown mounted on the base 11 in FIG. 1.

The control element is connected to ground 92, ground being the base 11 and all of the metallic machine elements which are not electrically isolated from the base 11. One such element in electrical communication with the base is the bearing member 20 which is in direct electrical contact with the metallic roller indicated at 93.

As can be seen from FIG. 2, contact of the cutting element 31 with the metallic roller after the cutting element has passed through the fabric will close the circuit to the control element such as the warning light 90 thereby causing the warning light to be illuminated.

Roller Cutter Assembly

Figure 5:
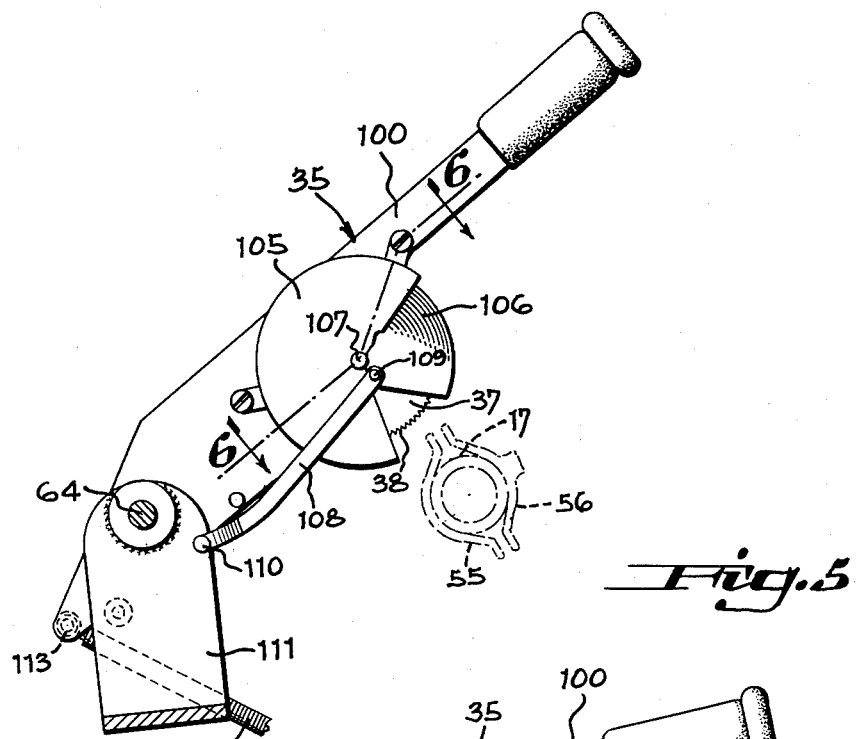
FIG. 5 is an elevational view of the roller cutter.
Figure 7:
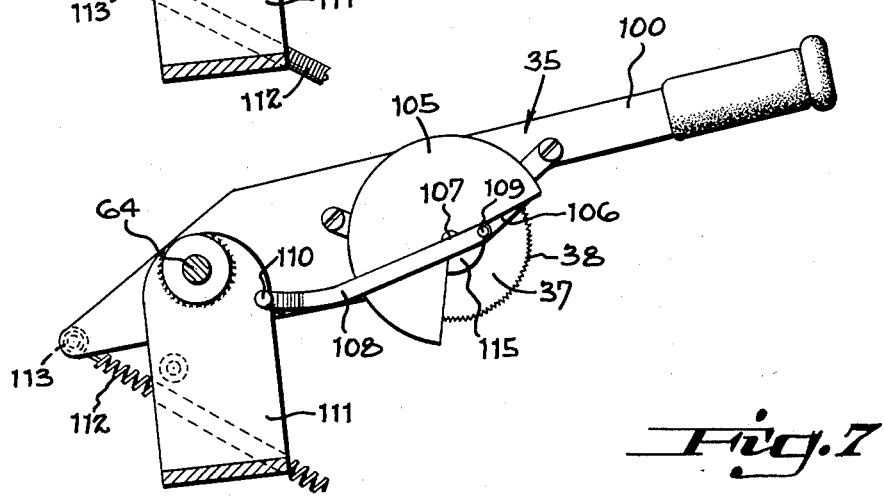
FIG. 7 is an elevational view similar to FIG. 5 showing a different position of the roller cutter.
Figure 6:
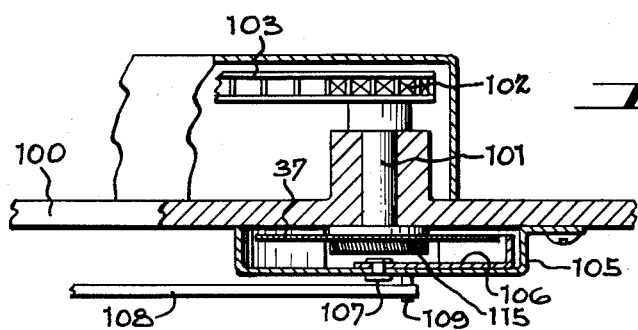
FIG. 6 is a cross sectional view taken along lines 6—6 of FIG. 5.

The roller cutter assembly is illustrated in FIGS. 5 to 7. The roller cutter 35 comprises a handle 100 which is pivoted about an axis concentric with the drive shaft 64 from the motor 12. The cutter element 37 or saw is in the form of a disc having saw teeth 38, the disc being mounted on a spindle 101 which is journaled in the arm 100. A sprocket 102 is fixed to the spindle 101 and receives an endless sprocket chain 103, the sprocket chain 103 also passing around the sprocket 104 fixed to the motor shaft 64. Because the sprocket 102 is smaller than the sprocket 104, the cutting element 37 will be rotated at a somewhat greater speed than the motor shaft 64.

The major portion of the cutting element 37 is surrounded by a shield 105 having a pivotally mounted shield element 106 secured to the shield by a rivet 107. A link 108 is pivotally connected at one end 109 to the shield element 106 and at the other end 110 to a bracket 111 which supports the arm 100. A tension spring 112 is connected at 113 to one end of the arm 100. The other end of the spring is fixed to the base by means of a connector 114. As viewed in FIGS. 5 and 7, the spring 112 urges the arm 100 in a counter-clockwise or uppermost direction. Downward and clockwise rotation of the arm 100 against the urging of the spring 112 causes the shield element 106 to pivot within the shield 105 so as to expose the saw edge and expose the saw teeth 38 of the cutting element 37. As shown in FIG. 5, it is the downward movement of the arm 100, exposing the cutting element which brings the cutting element into engagement with the metal roller.

As illustrated in FIG. 6, immediately adjacent the cutting element 37 is a chamfering disc 115 which is of smaller diameter than the cutting element 37. The disc 115 has a knurled peripheral surface which when brought into engagement with the end of a shade roller, will chamfer the end of the shade roller to facilitate the application of the metallic cap normally applied to a shade roller.

Operation

To describe the operation of the machine, let it be assumed that it is desired to shorten a window shade to fit a designated window frame. The bracket 19 is slid to the proper calibration 25 after loosening threaded clamping bolt 24 and is secured to the proper position by tightening the bolt. The slat is removed from the shade, and has one end positioned in the tray 28 attached to the bracket. The other end portion is located in the slot 43 of casting 41 and arm 44 is pulled down so that the saw blade 45 can sever the slat to the proper length.

The shade, with the slide removed is laid in the V-shaped support 21 with its pin end facing the collet 48. The lever 50 is pivoted to bring the collet into engagement with the pin and the handle 49 is turned to tighten the jaws of the collet about the pin. By reversing the movement of the lever 50, the collet is pulled toward the right as viewed in FIG. 1 thereby effecting removal of the pin. When the pin is removed, the cap can be slid off the end of the roller. In the case of a metal roller, the pin and cap are an assembled unit so that pulling on the pin will remove the pin and cap together.

The jaws 55 and 56 of the chuck are opened by counterclockwise rotation of the wing nut 59 and the window shade is positioned with its end 18 in abutting engagement with the bearing 20 and with its other end portion secured in the jaws 55 and 56. The jaws are clamped about the window shade by turning the wing nut in a clockwise direction. In this position, the portion of the window shade which is to be removed should project beyond the cutting elements 31 and 37 respectively.

With the window shade thus positioned, the shield 65 is pulled down by means of the handle 66 until the chuck is covered and the switch operator 68 is brought into engagement with the switch located in the base 11. The closing of the switch closes the circuit to the motor 12. Operation of the motor causes the chuck to be rotated through the belt drive 62. Rotation of the chuck causes rotation of the window shade about its axis.

The first cutting step in shortening the end of the window shade is to bring the fabric cutter into engagement with the window shade fabric by lifting on the handle 79. As viewed in FIG. 3, the clockwise movement of the cutter 30 causes the pivoting of the mask 80 with respect to the cutter element 31 thereby exposing the cutter element 31 for engagement with the fabric of the window shade. The rotation of the window shade with respect to the stationary cutter element 31 causes the knife edge of the cutter element to sever the fabric. In severing the fabric the cutter element moves through the several thicknesses of fabric toward the metallic roller. During this operation the operator maintains the signal light 90 under observation. As soon as the cutter element 31 contacts the metal roller, the electrical circuit of FIG. 2 is closed and the warning light 90 is illuminated. The instant the warning light is illuminated the operator removes the pressure on the handle 79 so as to minimize insofar as possible the dulling effect of the engagement of the cutter element knife edge with the metallic roller. The operation of course is substantially the same if the audible signal 89, or relay 91 is used in place of the light 90.

The severed fabric is stripped from the end of the roller and is removed. Thereafter the arm at 100 is pulled downwardly to expose the saw tooth cutter element 37 and to bring it into engagement with the metallic roller. Because of the chain drive 103, the saw tooth cutter element 37 is rotating at a comparatively high speed, as for example, 2,000 r.p.m., and rapidly moves through the metallic roller.

It should be observed that because of the manner in which the chuck and cutter element 31 respectively are driven, their peripheral speeds are additive.

After the metal roller has been cut through, the cap and pin assembly are replaced, the slat is inserted in the end of the fabric and the shade is ready for installation.

We claim:

1. Apparatus for cutting a window shade having fabric which has been wrapped about a metal roller comprising, a base, a chuck rotatably mounted on said base for gripping said window shade with a portion of said shade to be cut projecting from one side of said chuck, means for rotating said chuck, a fabric cutter mounted on said base, said fabric cutter having a cutting element movable into engagement with said fabric at a position spaced from said one side of said chuck, an electrical signal light, a source of power for said light, means electrically connecting said power source, light and roller in series whereby said signal light will be energized upon said fabric cutting element cutting said fabric and contacting said roller, a roller cutter mounted on said base, said roller cutter having a circular saw movable into engagement with said roller at a position spaced outwardly from the position of engagement of said fabric cutting element and means for rotating said saw.

2. Apparatus for cutting a window shade fabric which has been wrapped about a metal roller comprising, a base, a metallic bearing member mounted on said base for receiving the end of a roller in mechanical and electrical contact, a chuck mounted on said base for gripping said window shade, drive means for rotating said chuck to rotate said window shade about its axis, a fabric cutter mounted on said base and movable into engagement with said fabric, said fabric cutter including, a pin on said base, an arm pivotally mounted on said pin, an insulative bushing isolating said arm from said pin, and a cutting element on the free end of said arm, electrical control means, a source of power for said control means, and means for electrically connecting said cutting element, power source, electrical control means and bearing member in series, whereby engagement of said cutting element with said roller will close said series circuit and energize said electrical control means.

References Cited in the file of this patent

UNITED STATES PATENTS

| | | |
|---|---|---|
| 654,724 | Gage | July 31, 1900 |
| 1,085,946 | Seeley et al. | Feb. 3, 1914 |
| 1,242,448 | Judelshon | Oct. 9, 1917 |
| 1,361,185 | Rubin | Dec. 7, 1920 |
| 1,404,545 | Richardson | Jan. 24, 1922 |
| 2,387,478 | Tiffany | Oct. 23, 1945 |
| 2,783,838 | Ericson et al. | Mar. 5, 1957 |
| 2,788,070 | Seabury et al. | Apr. 9, 1957 |
| 2,888,048 | Gast et al. | May 26, 1959 |